United States Patent
Kim et al.

(10) Patent No.: US 9,442,593 B2
(45) Date of Patent: Sep. 13, 2016

(54) TOUCH SCREEN PANEL INTEGRATED DISPLAY DEVICE AND DISPLAY PANEL

(71) Applicant: LG DISPLAY CO., LTD., Seoul (KR)

(72) Inventors: SungChul Kim, Goyang-si (KR); JuHan Kim, Bucheon-si (KR); YongChan Park, Seoul (KR); Sujin Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 128 days.

(21) Appl. No.: 14/522,561

(22) Filed: Oct. 23, 2014

(65) Prior Publication Data

US 2016/0004371 A1 Jan. 7, 2016

(30) Foreign Application Priority Data

Jul. 3, 2014 (KR) .......................... 10-2014-0082938

(51) Int. Cl.
*G06F 3/041* (2006.01)
*G09G 3/20* (2006.01)

(52) U.S. Cl.
CPC ........... *G06F 3/0412* (2013.01); *G09G 3/2092* (2013.01); *G09G 2300/0426* (2013.01)

(58) Field of Classification Search
CPC .... G06F 3/044; G06F 3/0412; G06F 3/0416; G06F 3/041; G06F 3/3696; G06F 3/3655; G06F 3/3674; G06F 2310/0286
See application file for complete search history.

(56) References Cited

U.S. PATENT DOCUMENTS

2010/0253638 A1* 10/2010 Yousefpor ............. G06F 3/0416
345/173

(Continued)

FOREIGN PATENT DOCUMENTS

| JP | 2010-211905 A | 9/2010 |
| JP | 2011-082967 A | 4/2011 |
| JP | 2011-233018 A | 11/2011 |

(Continued)

OTHER PUBLICATIONS

Jang, Y.H. et al., "Integrated Gate Driver Circuit Using a-Si TFT with Dual Pull-down Structure," *Proceedings of the 11th International Display Workshops (IDW '04)*, Dec. 8-10, 2014, pp. 333-336, Toki Messe, Niigata, Japan.

(Continued)

*Primary Examiner* — Premal Patel
(74) *Attorney, Agent, or Firm* — Fenwick & West LLP

(57) ABSTRACT

The present invention relates to touch screen panel integrated display panel and display device. The touch screen panel integrated display panel comprises: a common electrode to which a common voltage is applied in a display mode and a touch driving signal is applied in a touch mode; a gate line that transfers a scan signal to a pixel row; and a gate driving integrated circuit that is connected to the gate line and outputs the scan signal to the gate line, wherein the gate driving integrated circuit includes a pull-up transistor and a pull-down transistor for outputting the scan signal to the gate line in the display mode, and additionally includes a touch mode transistor for outputting the touch driving signal applied to the common electrode or a signal corresponding to the touch driving signal to the gate line in the touch mode.

14 Claims, 16 Drawing Sheets

(56) References Cited

U.S. PATENT DOCUMENTS

| | | | |
|---|---|---|---|
| 2012/0038585 A1* | 2/2012 | Kim | G06F 3/0412 345/174 |
| 2012/0218482 A1* | 8/2012 | Hwang | G06F 3/044 349/12 |
| 2013/0147724 A1* | 6/2013 | Hwang | G06F 3/0412 345/173 |
| 2013/0335367 A1 | 12/2013 | Kim | |

FOREIGN PATENT DOCUMENTS

| | | |
|---|---|---|
| JP | 2013-506172 A | 2/2013 |
| JP | 2013-084168 A | 5/2013 |
| TW | I395189 B | 5/2013 |
| TW | I420458 B | 12/2013 |
| TW | 201413516 A | 4/2014 |
| TW | 201419071 A | 5/2014 |

OTHER PUBLICATIONS

Japan Patent Office, Office Action, Japanese Patent Application No. 2014-256168, Sep. 29, 2015, six pages [with concise explanation of relevance in English].

Taiwan Office Action, Taiwan Application No. 103144149, Mar. 24, 2016, 8 pages (with concise explanation of relevance).

Japanese Office Action, Japanese Application No. 2014-256168, Jun. 30, 2016, 6 pages.

* cited by examiner

TOUCH SCREEN PANEL INTEGRATED DISPLAY DEVICE AND DISPLAY PANEL

CROSS-REFERENCE TO RELATED APPLICATION

This application claims priority from and the benefit under 35 U.S.C. §119(a) of Korean Patent Application No. 10-2014-0082938, filed on Jul. 3, 2014, which is hereby incorporated by reference for all purposes as if fully set forth herein.

BACKGROUND OF THE INVENTION

1. Field of the Invention

The present invention relates to touch screen panel integrated display device and display panel.

2. Description of the Prior Art

Recently, demand for display devices for displaying images has increased. For example, various display devices such as Liquid Crystal Displays (LCDs), Plasma Display Panels (PDPs), and Organic Light Emitting Display Devices (OLEDs) have been utilized.

The display device includes a display panel, a data driving unit and a gate driving unit. The display panel includes data lines and gate lines, and pixels are defined at each point where the data lines and the gate lines intersect. The data driving unit provides data signals to the data lines. The gate driving unit provides scan signals to the gate lines.

In one implementation, the gate driving unit includes a pull-up transistor and a pull-down transistor in order to output a scan signal, outputs a high level voltage (VGH) to the gate line through the pull-up transistor in order to turn on a corresponding gate line, and outputs a low level voltage (VGL) to the gate line through the pull-down transistor in order to turn off a corresponding gate line.

At this time, the pull-down transistor in a gate driving integrated circuit may be turned on for a long time, and the pull-down transistor may be degraded.

When a display panel is implemented as a touch screen integrated type, an electrode formed in the display panel is utilized as a touch electrode for applying a touch driving signal. In the touch screen panel integrated display panel, when the touch driving signal is applied to the touch electrode, a parasitic capacitance which disturbs a touch driving and a touch sensing is formed in the display panel.

SUMMARY OF THE INVENTION

In this background, an aspect of the present invention concerns a touch screen panel integrated display device and display panel capable of preventing a generation of a parasitic capacitance between a gate line and a common electrode formed in a display panel.

Another aspect of the present invention concerns a touch screen panel integrated display device and display panel capable of preventing a generation of a parasitic capacitance between a data line and a common electrode formed in a display panel, when a touch driving signal is applied to a common electrode which operates as a touch electrode.

In order to solve the above-mentioned problems, an aspect of the present invention involves a touch screen panel integrated display device comprising: a display panel including a plurality of data lines, a plurality of gate lines and a plurality of common electrodes; a data driving unit that provides a data voltage to the plurality of data lines, when a driving mode is a display mode; and a gate driving unit that sequentially provides a scan signal to the plurality of gate lines, when the driving mode is the display mode, wherein a common voltage is applied to the plurality of common electrodes when the driving mode is the display mode, a touch driving signal is applied to at least one of the plurality of common electrodes when the driving mode is a touch mode, and each of a plurality of gate driving integrated circuits included in the gate driving unit includes a pull-up transistor and a pull-down transistor for outputting the scan signal to a corresponding gate line when the driving mode is the display mode, and additionally includes a touch mode transistor for outputting the touch driving signal or a signal corresponding to the touch driving signal to the corresponding gate line when the driving mode is the touch mode.

Another aspect of the present invention provides concerns a touch screen panel integrated display panel comprising: a common electrode to which a common voltage is applied in a case of a display mode and a touch driving signal is applied in a case of a touch mode; a gate line that transfers a scan signal to a pixel row; and a gate driving integrated circuit that is connected to the gate line and outputs the scan signal to the gate line, wherein the gate driving integrated circuit includes a pull-up transistor and a pull-down transistor for outputting the scan signal to the gate line in the case of the display mode, and additionally includes a touch mode transistor for outputting the touch driving signal applied to the common electrode or a signal corresponding to the touch driving signal to the gate line in the case of the touch mode.

In one aspect, the present invention involves a touch screen panel integrated display device and a display panel capable of preventing a generation of a parasitic capacitance between a gate line and a common electrode formed in a display panel, when a touch driving signal is applied to a common electrode which operates as a touch electrode.

In one aspect, the present invention involves a touch screen panel integrated display device and a display panel capable of preventing a generation of a parasitic capacitance between a data line and a common electrode formed in a display panel, when a touch driving signal is applied to a common electrode which operates as a touch electrode.

As described above, a generation of a parasitic capacitance maybe prevented or reduced, thereby reducing a load of a touch driving and improving a touch sensing accuracy.

In addition, according to the present invention, although a pull-down transistor for outputting a scan signal of a low level voltage to a gate line in a display mode is degraded, regardless of the degradation, in a case of a touch mode, a touch driving signal can be applied to a gate line in a desired form using a touch mode transistor.

Therefore, a generation of a parasitic capacitance between a common electrode and a gate line can be further reduced.

In addition, according to the present invention, in order to reduce a degradation of a pull-down transistor for outputting a scan signal of a low level voltage to a gate line in a display mode, when different pull-down transistors are alternately driven for displaying an odd-numbered frame and an even-numbered frame, although a degradation difference between two pull-down transistors alternately driven for displaying the odd-numbered frame and the even-numbered frame is generated, regardless of the degradation difference, in a case of a touch mode, a touch driving signal can be applied to a gate line in a desired form using a touch mode transistor.

Therefore, a generation of a parasitic capacitance between a common electrode and a gate line can be further reduced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
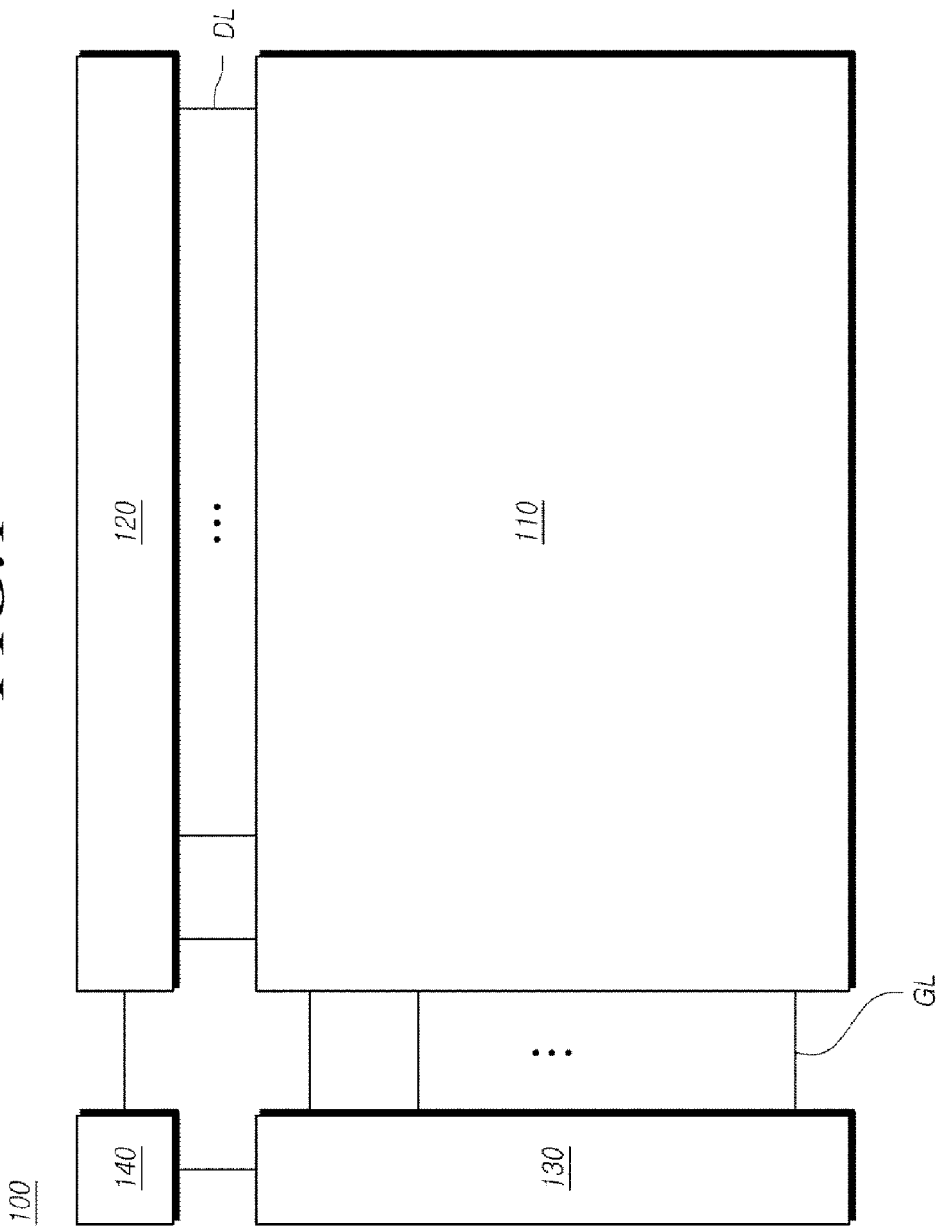
FIG. 1 is a view schematically illustrating a touch screen panel integrated display device according to an embodiment.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view schematically illustrating a touch screen panel integrated display device 100 according to an embodiment.

Referring to FIG. 1, the touch screen panel integrated display device 100 according to an embodiment includes a display panel 110, a data driving unit 120, a gate driving unit 130, a timing controller 140, etc. The display panel 110 includes a plurality of Data Lines (DLs) and a plurality of Gate Lines (GLs). The data driving unit 120 provides a data voltage to the plurality of data lines when a driving mode is a display mode. The gate driving unit 130 sequentially provides a scan signal to the plurality of gate lines when the driving mode is the display mode. The timing controller 140 controls the data driving unit 120 and the gate driving unit 130.

The above-mentioned data driving unit 120 may include at least one Data Driving Integrated Circuits (DDICs), and the at least one data driving integrated circuit may be connected to a bonding pad of the display panel 110 in a Tape Automated Bonding (TAB) scheme or a Chip On Glass (COG) scheme. The at least one data driving integrated circuit may be integrated and formed in the display panel 110.

The above-mentioned gate driving unit 130 may be positioned on one side of the display panel 110 as illustrated in FIG. 1 or may be divided into two units and positioned on both sides of the display panel 110, depending on a driving type of the gate driving unit 130.

In addition, the gate driving unit 130 may include at least one Gate Driving Integrated Circuit (GDIC), the at least one gate driving integrated circuit may be connected to a bonding pad of the display panel 110 in a Tape Automated Bonding (TAB) scheme or a Chip On Glass (COG) scheme, or implemented in a Gate In Panel (GIP) type and directly formed in the display panel 110. The at least one gate driving integrated circuit may be integrated and formed in the display panel 110.

Meanwhile, the display panel 110 according to an embodiment includes a Touch Screen Panel (TSP) therein, and may be referred to as a touch screen panel integrated display panel. That is, the display panel 110 according to an embodiment has a display panel function and a touch screen panel function.

Figure 2:
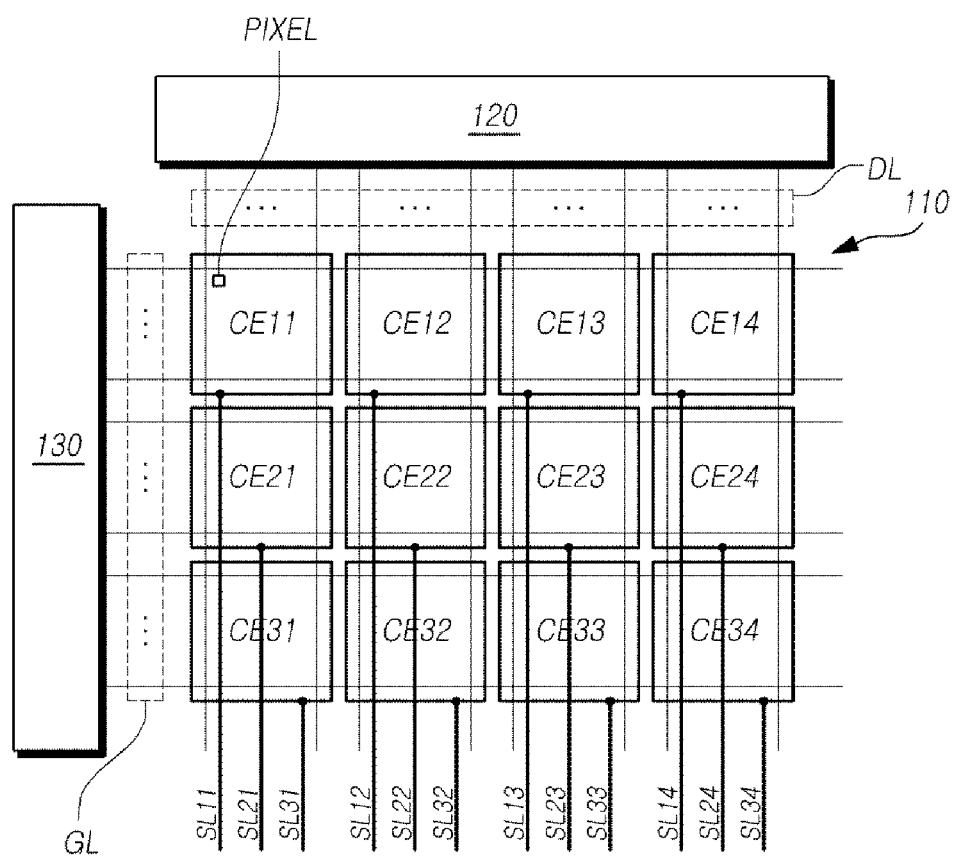
FIG. 2 is a view illustrating a panel part in the touch screen panel integrated display device according to an embodiment in more detail.

Thus, FIG. 2 illustrates the touch screen panel integrated display panel 110 according to an embodiment in more detail.

FIG. 2 is a view illustrating the display panel part in the touch screen panel integrated display device according to an embodiment in more detail.

Referring to FIG. 2, the touch screen panel integrated display panel 110 operates as a display panel when a driving mode is a display mode, and operates as a touch screen panel when the driving mode is a touch mode.

Referring to FIG. 2, the touch screen panel integrated display panel 110 includes a plurality of Common Electrodes (CEs) as well as the plurality of data lines DL and the plurality of gate lines GL.

Referring to FIG. 2, the plurality of common electrodes CE11, CE12, CE13, CE14, CE21, CE22, CE23, CE24, CE31, CE32, CE33 and CE34 are electrodes enabling the display panel 110 to operate as the display panel and the touch screen panel.

Thus, the plurality of common electrodes CE11, CE12, CE13, CE14, CE21, CE22, CE23, CE24, CE31, CE32, CE33 and CE34 receive a common voltage (Vcom) when the driving mode is the display mode, and receive a touch driving signal (Vtm) when the driving mode is the touch mode.

That is, when the driving mode is the display mode, the same common voltage (Vcom) is applied to the plurality of common electrodes CE11, CE12, CE13, CE14, CE21, CE22, CE23, CE24, CE31, CE32, CE33 and CE34. When the driving mode is the touch mode, the touch driving signal (Vtm) for detecting an existence-or-not of a touch, touch coordinates and the like is applied to one or more of the plurality of common electrodes CE11, CE12, CE13, CE14, CE21, CE22, CE23, CE24, CE31, CE32, CE33 and CE34. In this case, the plurality of common electrodes CE11, CE12, CE13, CE14, CE21, CE22, CE23, CE24, CE31, CE32, CE33 and CE34 operate as touch electrodes.

Referring to FIG. 2, when the driving mode is the display mode, in order to transfer the common voltage (Vcom) to the plurality of common electrodes CE11, CE12, CE13, CE14, CE21, CE22, CE23, CE24, CE31, CE32, CE33 and CE34, and when the driving mode is the touch mode, in order to transfer the touch driving signal (Vtm) to at least one of the plurality of common electrodes CE11, CE12, CE13, CE14, CE21, CE22, CE23, CE24, CE31, CE32, CE33 and CE34, signal lines SL11, SL12, SL13, SL14, SL21, SL22, SL23, SL24, SL31, SL32, SL33 and SL34 respectively connected to the plurality of common electrodes CE11, CE12, CE13, CE14, CE21, CE22, CE23, CE24, CE31, CE32, CE33 and CE34 are formed in the display panel 110.

Figure 3:
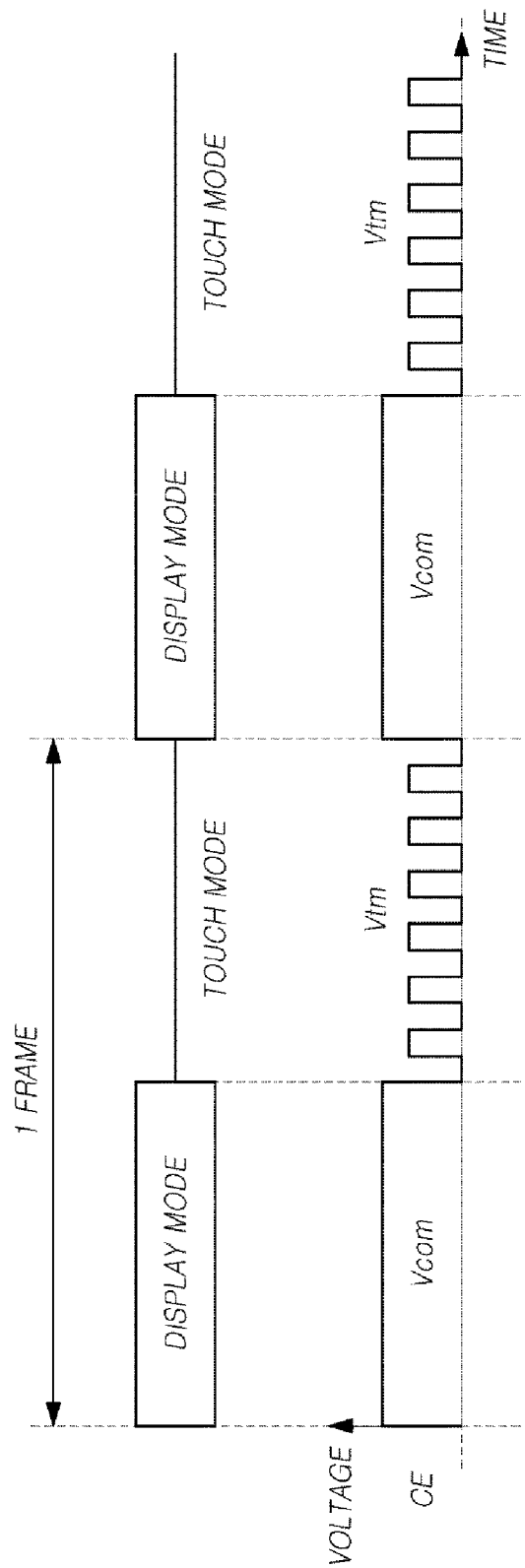
FIG. 3 is a timing diagram illustrating a signal applied to a common electrode according to a driving mode (e.g., a display mode and a touch mode) of the touch screen panel integrated display device according to an embodiment.

FIG. 3 is a timing diagram illustrating a signal applied to a Common Electrode (CE) according to the driving mode (e.g., the display mode and the touch mode) of the touch screen panel integrated display device 100 according to an embodiment.

Referring to FIG. 3, the display mode and the touch mode are successive in each of frames.

Referring to FIG. 3, in the display mode, the common voltage Vcom is applied to the common electrode CE, and in the touch mode, the touch driving signal Vtm is applied to the common electrode CE.

In the touch mode, the touch driving signal Vtm is applied to the common electrode CE, thus a touch sensing is performed.

In relation to this, the touch screen panel integrated display device 100 employs a capacitance touch scheme which detects the touch-existence-or-not (i.e., whether a touch screen panel is touched or not), the touch coordinates and the like based on a capacitance change through a plurality of touch electrodes (e.g., a horizontal electrode and a vertical electrode) formed in the touch screen panel, as a touch scheme.

For example, the capacitance touch scheme may be classified into a mutual capacitance touch scheme, a self-capacitance touch scheme, etc.

Firstly, the mutual capacitance touch scheme, which is one type of the capacitance touch scheme, is a touch scheme wherein one of the horizontal electrode and the vertical electrode is a Tx electrode (referred to as a driving electrode) to which a driving voltage is applied, and another of the horizontal electrode and the vertical electrode is an Rx electrode (referred to as a sensing electrode), which senses the driving voltage and forms a capacitance with the Tx electrode. The touch-existence-or-not, the touch coordinates and the like are detected based on a change of a capacitance (i.e. a mutual capacitance) between the Tx electrode and the Rx electrode according to whether a pointer such as a finger and a pen exists or not.

Next, the self-capacitance touch scheme, which is another type of the capacitance touch scheme, is a scheme forming a capacitance (i.e., a self-capacitance) between a touch electrode and a pointer such as a finger and a pen, measuring a capacitance between the touch electrode and the pointer according to whether the pointer such as the finger and the pen exists, and detecting the touch-existence-or-not, the touch coordinates and the like based on the measurement. In the self-capacitance touch sensing scheme, the driving voltage (i.e. the touch driving signal) is applied to each of the touch electrodes and sensed simultaneously, unlike in the mutual capacitance touch scheme.

The touch screen panel integrated display device 100 according to an embodiment may employ one of the above-mentioned two types of capacitance touch schemes (i.e. the mutual capacitance touch scheme and the self-capacitance touch scheme). In the present specification, for convenience of description, an embodiment is described under the assumption that the self-capacitance touch scheme is employed.

Figure 4:
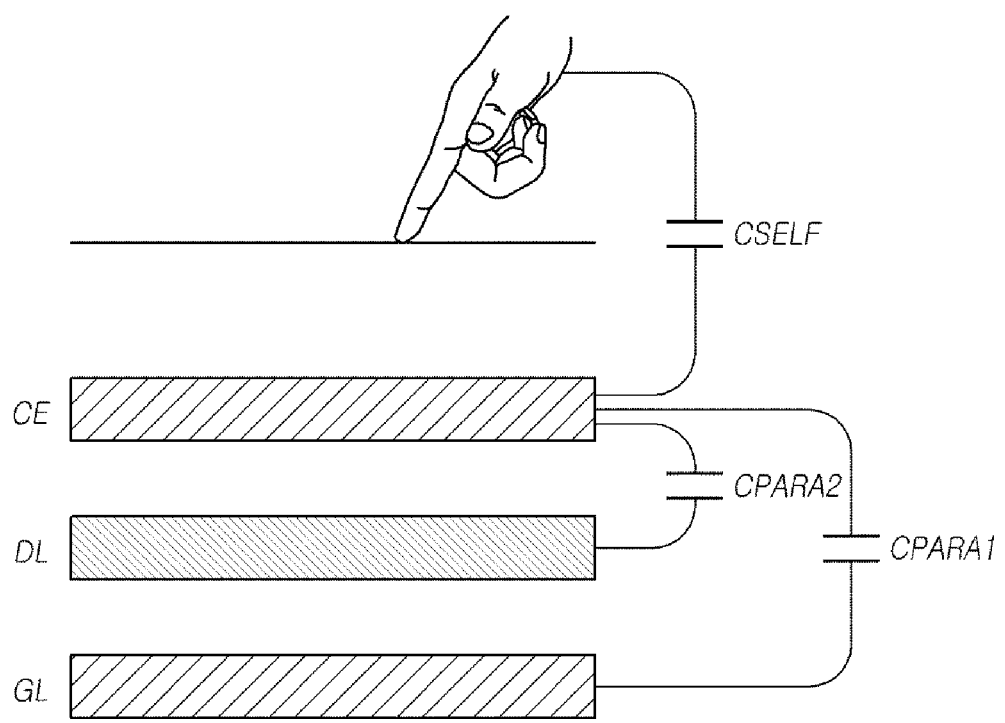
FIG. 4 is a view illustrating a capacitance component occurring in the touch screen panel integrated display device according to an embodiment.

FIG. 4 is a view illustrating capacitance components Cself, Cpara1 and Cpara2 occurring in the touch screen panel integrated display device 100 according to an embodiment.

Referring to FIG. 4, in the touch mode, the capacitance Cself is formed between the plurality of common electrodes CE11, CE12, CE13, CE14, CE21, CE22, CE23, CE24, CE31, CE32, CE33 and CE34, which operate as the touch electrodes in the touch mode and operate as the common electrodes for providing the common voltage (Vcom) to all pixels in the display mode, and the pointer such as the finger and the pen, in order to detect the touch-existence-or-not, the touch coordinates and the like. However, unnecessary parasitic capacitances (Cpara) Cpara1 and Cpara2 may be formed between the plurality of common electrodes CE11, CE12, CE13, CE14, CE21, CE22, CE23, CE24, CE31, CE32, CE33 and CE34 and the pointer.

The parasitic capacitances Cpara1 and Cpara2 occurring in the case of the touch mode are a large load of the touch driving, thus may reduce an accuracy of the touch sensing, or may disable the touch sensing. The parasitic capacitance (Cpara) may become significant as a size of the display device 100 or the display panel 110 becomes larger.

Figure 5:
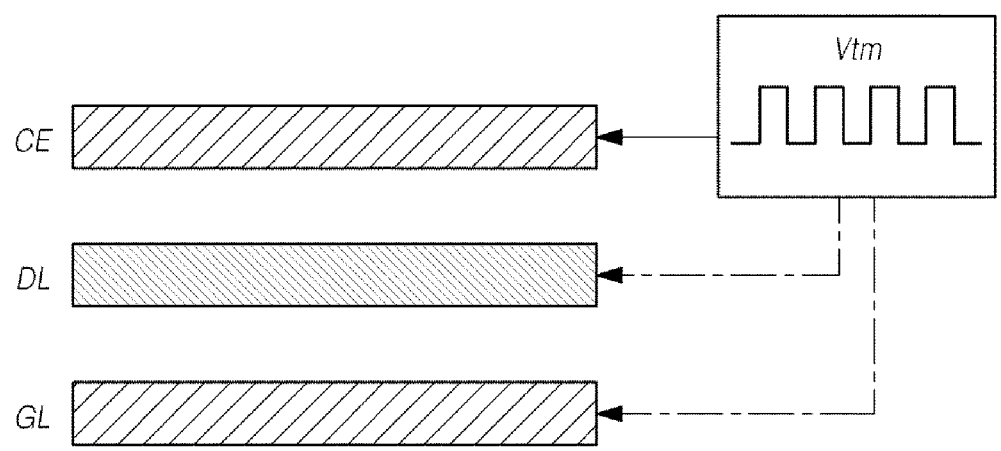
FIG. 5 is a diagram illustrating an application of a touch driving signal to a data line and a gate line in consideration of a generation of a parasitic capacitance in the touch screen panel integrated display device according to an embodiment.

FIG. 5 is a diagram illustrating an application of the touch driving signal Vtm to the data line DL and the gate line GL in consideration of the parasitic capacitances Cpara1 and Cpara2 when the driving mode is the touch mode in the touch screen panel integrated display device 100 according to an embodiment.

Referring to FIG. 5, in the touch screen panel integrated display device 100 according to an embodiment, when the driving mode is the touch mode, the touch driving signal Vtm or a signal corresponding to the touch driving signal Vtm applied to at least one of the plurality of common electrodes CE is also applied to the data line DL and the gate line GL.

Therefore, a potential difference between the common electrode CE and the gate line GL is not formed, thus the parasitic capacitance Cpara1 between the common electrode CE and the gate line GL is not formed. In addition, a potential difference between the common electrode CE and the data line DL is not formed, thus the parasitic capacitance Cpara2 between the common electrode CE and the data line DL is not formed.

Figure 6:
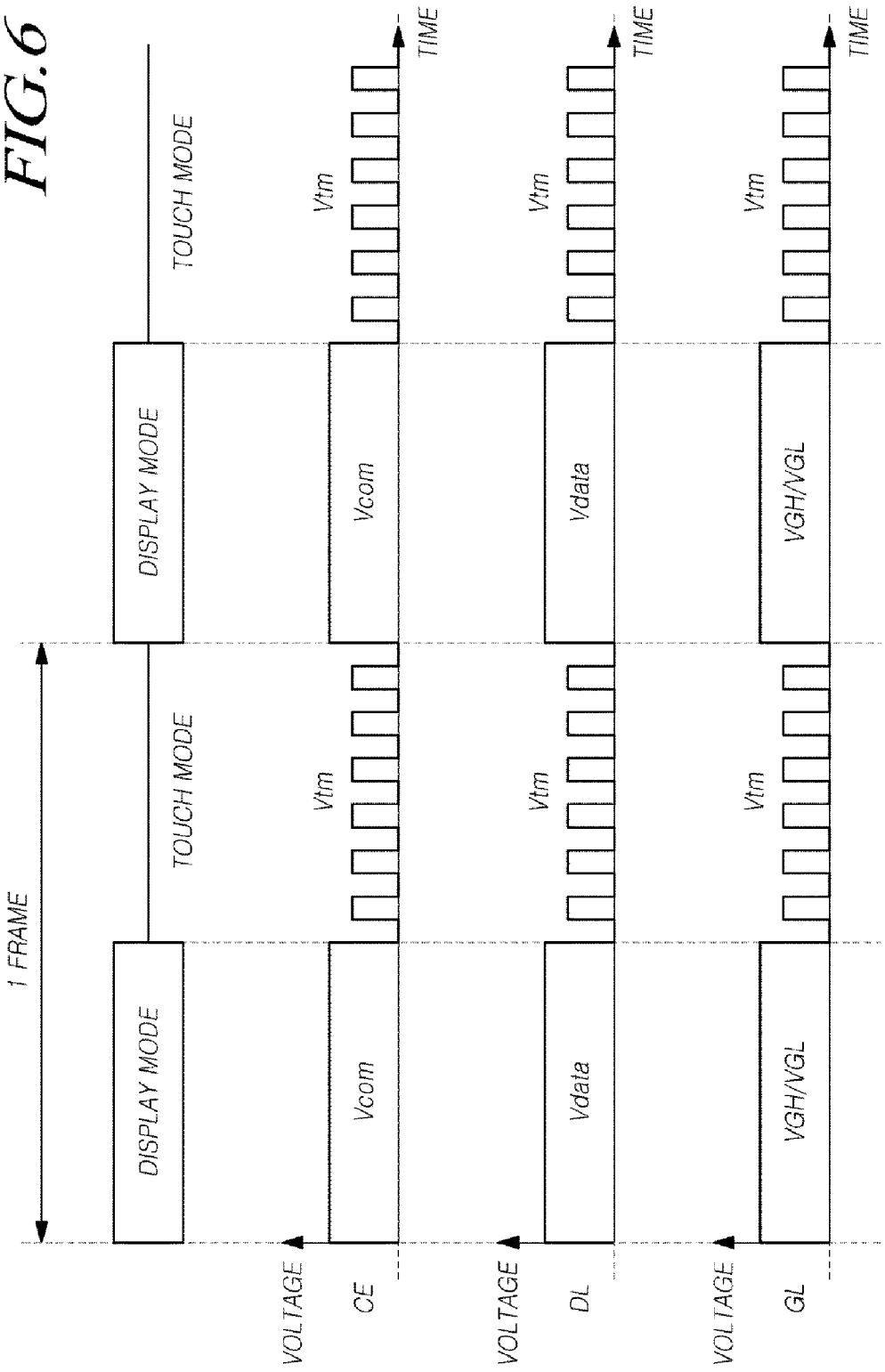
FIG. 6 illustrates waveforms of signals applied to a common electrode, a data line and a gate line according to the driving mode (e.g., the display mode and the touch mode) of the touch screen panel integrated display device according to an embodiment.

When the display mode and the touch mode repeat in each frame, in the cases of the display mode and the touch mode, waveforms of signals applied to the common electrode CE, the data line DL and the gate line GL are similar to waveforms shown in FIG. 6.

FIG. 6 illustrates waveforms of the signals output to the common electrode CE, the data line DL and the gate line GL in the driving mode (e.g., the display mode and the touch mode) of the touch screen panel integrated display device 100 according to an embodiment.

Referring to FIG. 6, when the driving mode is the display mode, the data driving unit 120 outputs a data voltage Vdata to the data line DL. The gate driving unit 130 outputs, to a corresponding gate line GL, a scan signal which has the high level voltage VGH during a short period and has the low level voltage VGL during a remaining long period.

In addition, when the driving mode is the display mode, the common voltage Vcom provided from a common voltage providing unit (indicated by reference numeral 1410 of FIG. 14) described later is applied to the plurality of common electrodes CE11, CE12, CE13, CE14, CE21, CE22, CE23, CE24, CE31, CE32, CE33 and CE34 through the plurality of signal lines SL11, SL12, SL13, SL14, SL21, SL22, SL23, SL24, SL31, SL32, SL33 and SL34.

At this time, the common voltage Vcom may be transferred from the common voltage providing unit (1410 of FIG. 14) to the data driving unit 120, and then may be output to the plurality of signal lines SL11, SL12, SL13, SL14, SL21, SL22, SL23, SL24, SL31, SL32, SL33 and SL34 by the data driving unit 120. In addition, the common voltage Vcom may be directly output to the plurality of signal lines SL11, SL12, SL13, SL14, SL21, SL22, SL23, SL24, SL31, SL32, SL33 and SL34 by the common voltage providing unit (1410 of FIG. 14), without the data driving unit 120.

The application path and the application scheme of the common voltage will be described in more detail with reference to FIGS. 15 and 16.

Meanwhile, when the driving mode is the touch mode, the touch driving signal Vtm provided from the touch sensing unit (indicated by reference numeral 1400 of FIG. 14) described later is applied to at least one of the plurality of common electrodes CE11, CE12, CE13, CE14, CE21, CE22, CE23, CE24, CE31, CE32, CE33 and CE34 through at least one of the plurality of signal lines SL11, SL12, SL13, SL14, SL21, SL22, SL23, SL24, SL31, SL32, SL33 and SL34.

At this time, for example, the touch driving signal Vtm may be generated from the touch sensing unit (1400 of FIG. 14) described later, and may be output to at least one of the signal lines SL11, SL12, SL13, SL14, SL21, SL22, SL23, SL24, SL31, SL32, SL33 and SL34 through the data driving unit 120. In addition, the touch driving signal Vtm may be generated from the touch sensing unit (1400 of FIG. 14) described later, and may be directly output to at least one of the signal lines SL11, SL12, SL13, SL14, SL21, SL22, SL23, SL24, SL31, SL32, SL33 and SL34.

In addition, in the case wherein the driving mode is the touch mode, when the touch driving signal Vtm provided from the touch sensing unit (1400 of FIG. 14) described later is applied to at least one of the plurality of common electrodes CE11, CE12, CE13, CE14, CE21, CE22, CE23, CE24, CE31, CE32, CE33 and CE34 through at least one of the plurality of signal lines SL11, SL12, SL13, SL14, SL21, SL22, SL23, SL24, SL31, SL32, SL33 and SL34, the data driving unit 120 may output the touch driving signal Vtm or the signal corresponding to the touch driving signal Vtm and the gate driving unit 130 may output the touch driving signal Vtm or the signal corresponding to the touch driving signal Vtm.

At this time, the data driving unit 120 may receive the touch driving signal Vtm or the signal corresponding to the touch driving signal Vtm from the touch sensing unit (1400 of FIG. 14) and output the touch driving signal Vtm or the signal corresponding to the touch driving signal Vtm to the data line DL. Alternatively, the data driving unit 120 may output the predetermined touch driving signal Vtm or the signal corresponding to the touch driving signal Vtm to the data line DL, without receiving a signal from the touch sensing unit (1400 of FIG. 14).

In the same manner, the gate driving unit 130 may receive the touch driving signal Vtm or the signal corresponding to the touch driving signal Vtm from the touch sensing unit (1400 of FIG. 14) and output the touch driving signal Vtm or the signal corresponding to the touch driving signal Vtm to the gate line GL. Alternatively, the gate driving unit 130 may output the predetermined touch driving signal Vtm or the signal corresponding to the touch driving signal Vtm to the gate line GL, without receiving a signal from the touch sensing unit (1400 of FIG. 14).

The application path and the application scheme of the touch driving signal will be described in more detail with reference to FIGS. 15 and 16.

Hereinafter, when the driving mode is the touch mode, the gate driving unit 130 outputting the touch driving signal Vtm to the gate line GL is described in more detail with reference to FIGS. 7 to 13.

Figure 7:
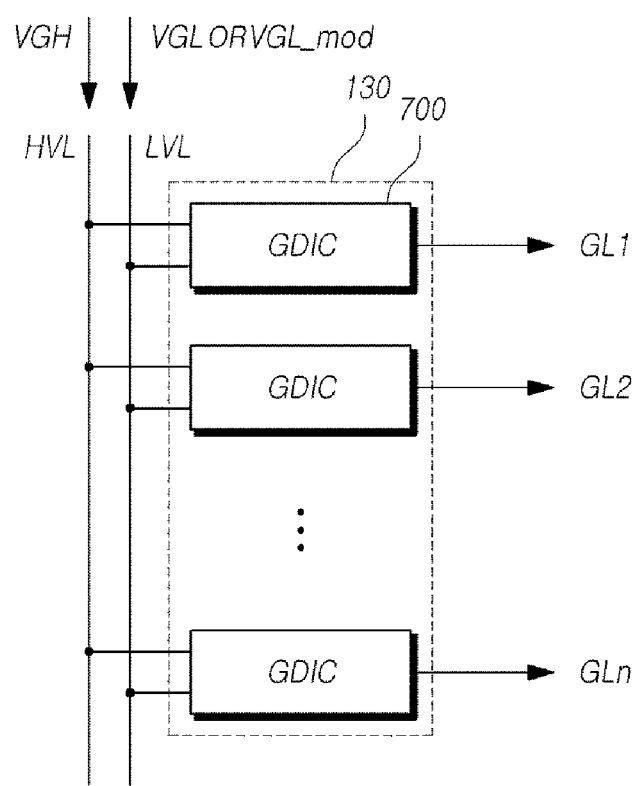
FIG. 7 is a view illustrating gate driving integrated circuits in a gate driving unit for applying scan signals (VGH and VGL) or a touch driving signal to the gate line according to the driving mode (e.g., the display mode and the touch mode) in the touch screen panel integrated display device according to an embodiment.

FIG. 7 is a view illustrating a plurality of gate driving integrated circuits (GDICs) 700 in the gate driving unit 130 for applying the scan signals (VGH and VGL) or the touch driving signal Vtm to the gate line according to the driving mode (e.g., the display mode and the touch mode) in the touch screen panel integrated display device 100 according to an embodiment.

Referring to FIG. 7, in the touch screen panel integrated display device 100, the gate driving unit 130 may include a plurality of Gate Driving Integrated Circuits (GDICs) 700 formed in the display panel 110 in the Gate In Panel (GIP) scheme.

Referring to FIG. 7, a High level Voltage Line (HVL) transferring the high level voltage (VGH) to a plurality of gate driving integrated circuits 700 and a Low level Voltage Line (LVL) transferring the low level voltage (VGL) to the plurality of gate driving integrated circuits 700 are formed in the display panel 110 such that each of the plurality of gate driving integrated circuits 700 generates and outputs a scan signal.

Referring to FIG. 7, the plurality of gate driving integrated circuits 700, the High level Voltage Line (HVL) and the Low level Voltage Line (LVL) may be formed in a non-active area of the display panel 110.

Referring to FIG. 7, the high level voltage (VGH) may be a clock signal (CLK). In this case, the high level voltage line HVL may include two or more clock signal lines transferring two or more of the clock signals (CLK1, CLK2, etc.).

Referring to FIG. 7, when the driving mode is the display mode, each of the plurality of the gate driving integrated circuits 700 included in the gate driving unit 130 may generate a scan signal which has the high level voltage VGH during a short period and the low level voltage VGL during a remaining long period in the one frame, based on the high level voltage VGH transferred through the high level voltage line HVL and the low level voltage VGL transferred from the low level voltage LVL, and output the scan signal to a corresponding gate line GL.

Referring to FIG. 7, when the driving mode is the touch mode, as an example, each of the plurality of gate driving integrated circuits 700 included in the gate driving unit 130 may receive the low level voltage VGL through the low level voltage line LVL, modulate a signal corresponding to the transferred low level voltage VGL to generate the touch driving signal Vtm of a square waveform having a predetermined magnitude and phase, and output the touch driving signal Vtm to the corresponding gate line GL.

Referring to FIG. 7, when the driving mode is the touch mode, as another example, each of the plurality of gate driving integrated circuits 700 included in the gate driving unit 130 may receive the touch driving signal Vtm of a square waveform having a predetermined size and phase through the low level voltage line LVL, and output the touch driving signal Vtm to the corresponding gate line GL.

Here, the touch driving signal Vtm is a signal modulated from the low level voltage VGL, as the signal of the square waveform having the predetermined size and phase, as shown in FIGS. 5 and 6. Therefore, the touch driving signal Vtm is also written as "VGL_mod".

Each of the plurality of gate driving integrated circuits 700 shown in FIG. 7 includes a pull-up transistor Tup and a pull-down transistor Tdown connected to a point Nout where the scan signal is output to the gate line GL, and a control circuit controlling the pull-up transistor Tup and the pull-down transistor Tdown.

The gate driving integrated circuit 700 is described with reference to FIGS. 8 through 11.

Figure 8:
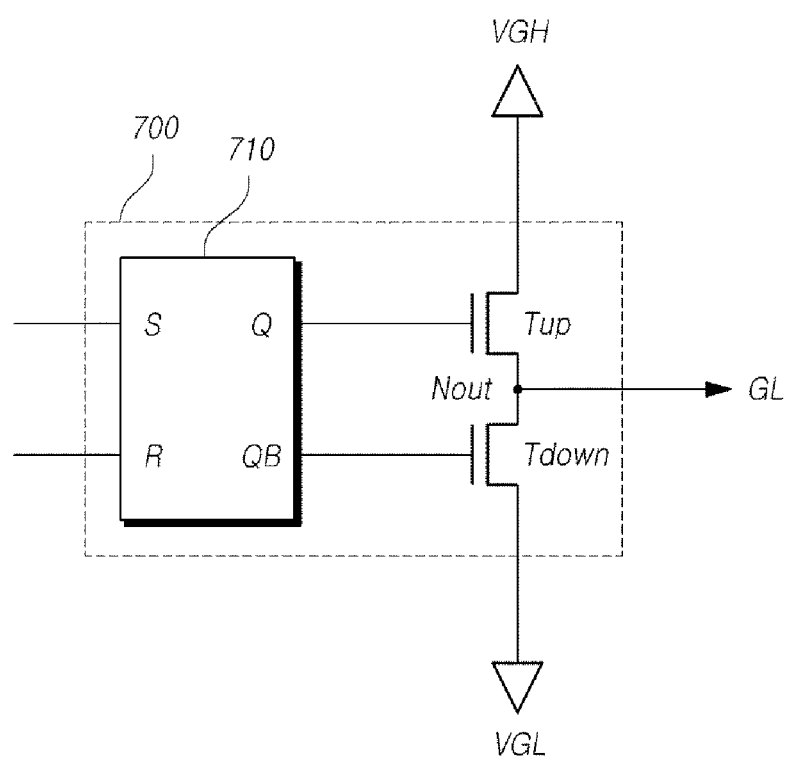
FIG. 8 is an example view illustrating a gate driving integrated circuit having a basic gate driving structure in the touch screen panel integrated display device according to an embodiment.

FIG. 8 is an example view illustrating the gate driving integrated circuit having a basic gate driving structure in the touch screen panel integrated display device according to an embodiment.

Referring to FIG. 8, the gate driving integrated circuit includes a pull-up transistor Tup, a pull-down transistor Tdown and a control circuit 710 controlling the pull-up transistor Tup and the pull-down transistor Tdown.

Here, the control circuit 710 includes a Q node at which a gate voltage of the pull-up transistor Tup is controlled, a QB node at which a gate voltage of the pull-down transistor is controlled, a set node S and a reset node R.

Referring to FIG. 8, when the driving mode is the display mode, the gate driving integrated circuit 700 turns on the pull-up transistor Tup and outputs the high level voltage VGH to the gate line GL through the output node Nout in order to activate the corresponding gate line GL, and turns on the pull-down transistor Tdown and outputs the low level voltage VGL to the gate line GL through the output node Nout in order to deactivate the corresponding gate line GL.

Referring to FIG. 8, when the driving mode is the touch mode, the gate driving integrated circuit 700 turns on the pull-down transistor Tdown and outputs the touch driving signal Vtm (also referred to VGL_mod) which is modulated from the low level voltage VGL and has the square waveform to the gate line GL through the output node Nout.

Referring to FIG. 8, when the driving mode is the display mode, the deactivated time of the corresponding gate line GL is much longer than the activation time of the corresponding gate line GL. That is, the scan signal has the high level voltage VGH for the short time and the low level voltage VGL for the longer time.

The gate driving integrated circuit 700 outputting the low level voltage VGL by the one pull-down transistor Tdown as shown in FIG. 8 is referred to as the "basic gate driving structure".

In the gate driving integrated circuit 700 having the basic gate driving structure as shown in FIG. 8, one pull-down transistor Tdown should be turned on for a long time, and thus the pull-down transistor Tdown may be degraded.

In the touch mode, a signal actually applied to the gate line GL through the pull-down transistor Tdown may change due to the degradation of the pull-down transistor Tdown.

In addition, in the touch mode, the size or phase of the signal actually applied to the gate line GL through the pull-down transistor Tdown may be different from those of the touch driving signal Vtm (VGL_mode) desired to be applied, due to the degradation of the pull-down transistor Tdown.

That is, in the touch mode, the sizes or phases of the signal actually applied to the gate line GL through the pull-down transistor Tdown and a signal applied to the common electrode CE may be changed due to the degradation of the pull-down transistor Tdown.

This may incur a potential difference between the gate line GL and the common electrode CE and form a parasitic capacitance between the gate line GL and the common electrode CE.

Therefore, in the embodiment, in order to prevent or reduce the degradation of the pull-down transistor Tdown, the GDIC 700 which uses different pull-down transistors Tdown in odd-numbered frames and even-numbered frames is disclosed, and the GDIC 700 is described with reference to FIG. 9.

Figure 9:
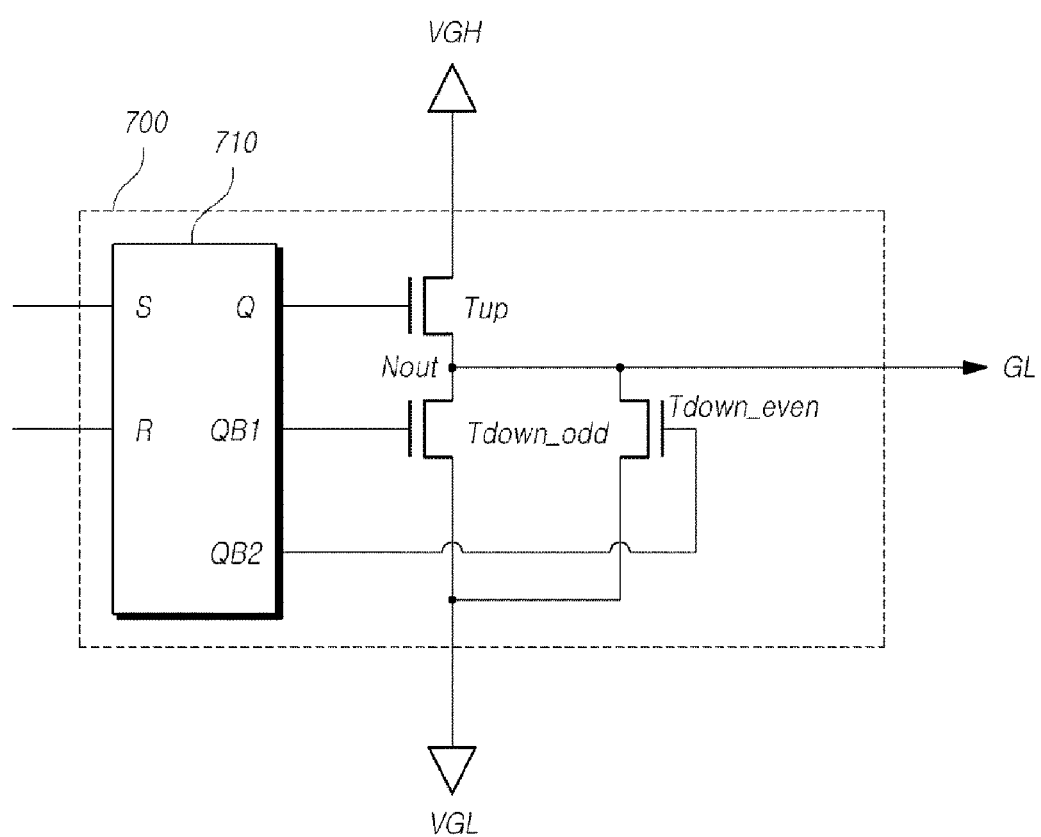
FIG. 9 is an example view illustrating a gate driving integrated circuit having an alternating gate driving structure in the touch screen panel integrated display device according to an embodiment.

FIG. 9 is an example view illustrating the gate driving integrated circuit 700 having an alternating gate driving structure in the touch screen panel integrated display device 100 according to an embodiment.

Referring to FIG. 9, the gate driving integrated circuit 700 includes a pull-up transistor Tup, a first pull-down transistor Tdown_odd operated in odd-numbered frames, a second pull-down transistor Tdown_even operated in even-numbered frames, and a control circuit 710 controlling the pull-up transistor Tup, the first pull-down transistor Tdown_odd and the second pull-down transistor Tdown_even.

Here, the control circuit 710 includes a Q node at which a gate voltage of the pull-up transistor Tup is controlled, a QB1 node at which a gate voltage of the first pull-down transistor Tdown_odd is controlled, a QB2 node at which a gate voltage of the second pull-down transistor Tdown_even is controlled, a set node S and a reset node R.

Referring to FIG. 9, when the driving mode is the display mode, in the odd-numbered frame, the gate driving integrated circuit 700 turns on the pull-up transistor Tup and outputs the high level voltage VGH to the gate line GL through the output node Nout in order to activate the corresponding gate line GL, and turns on the first pull-down transistor Tdown_odd and outputs the low level voltage VGL to the gate line GL through the output node Nout in order to deactivate the corresponding gate line GL.

Referring to FIG. 9, when the driving mode is the touch mode, in the odd-numbered frame, the gate driving integrated circuit 700 turns on the first pull-down transistor Tdown_odd and outputs the touch driving signal Vtm (also referred to VGL_mod), which is modulated from the low level voltage VGL and has the square waveform, to the gate line GL through the output node Nout.

Referring to FIG. 9, when the driving mode is the display mode, in the even-numbered frame, the gate driving integrated circuit 700 turns on the pull-up transistor Tup and outputs the high level voltage VGH to the gate line GL through the output node Nout in order to activate the corresponding gate line GL, and turns on the second pull-down transistor Tdown_even and outputs the low level voltage VGL to the gate line GL through the output node Nout in order to deactivate the corresponding gate line GL.

Referring to FIG. 9, when the driving mode is the touch mode, in the even-numbered frame, the gate driving integrated circuit 700 turns on the second pull-down transistor Tdown_even and outputs the touch driving signal Vtm (also referred to VGL_mod) which is modulated from the low level voltage VGL and has the square waveform to the gate line GL through the output node Nout.

As described above, since the gate driving integrated circuit 700 shown in FIG. 9 alternately drives the first pull-down transistor Tdown_odd and the second pull-down transistor Tdown_even in the odd-numbered frame period and the even-numbered frame period, the gate driving integrated circuit shown in FIG. 9 is referred to as the "alternating gate driving structure".

As described above, when the gate driving integrated circuit 700 has the alternating gate driving structure as shown in FIG. 9, the degradations of the first pull-down transistor Tdown_odd and the second pull-down transistor Tdown_even can be reduced compared to the gate driving integrated circuit 700 having the basic gate driving structure shown in FIG. 8.

Therefore, the gate driving integrated circuit 700 having the alternating gate driving structure as shown in FIG. 9 can remarkably reduce the capacitance between the gate line GL and the common electrode CE formed by the generation of the potential difference between the gate line GL and the common electrode CE. Here, the potential difference is generated because the size or phase of the signal actually applied to the gate line GL becomes different from that of the touch driving signal Vtm (VGL_mod) desired to be applied due to the degradation of the pull-down transistor Tdown in the gate driving integrated circuit 700 having the basic gate driving structure shown in FIG. 8.

Meanwhile, in the gate driving integrated circuit 700 having the alternating gate driving structure as shown in FIG. 9, degradations between the first pull-down transistor Tdown_odd and the second pull-down transistor may be different.

Therefore, the size or the phase of the signal actually applied to the gate line GL through the first pull-down transistor Tdown_odd may be different from that of the signal actually applied to the gate line GL through the second pull-down transistor Tdown_even.

Thus, in one of the odd-numbered frame and the even-numbered frame, a potential difference between the gate line GL and the common electrode CE is generated, and thus a parasitic capacitance may be formed between the gate line GL and the common electrode CE.

In addition, the potential difference between the gate line GL and the common electrode CE in the odd-number frame may be different from the potential difference between the gate line GL and the common electrode CE in the even-number frame. Thus the parasitic capacitances may be differently formed between the gate line GL and the common electrode CE.

Hereinafter, when the driving mode is the touch mode, the gate driving integrated circuit 700 using an additional transistor (hereinafter, referred to as a touch mode transistor Ttm) is described with reference to FIGS. 10 and 11.

Figure 10:
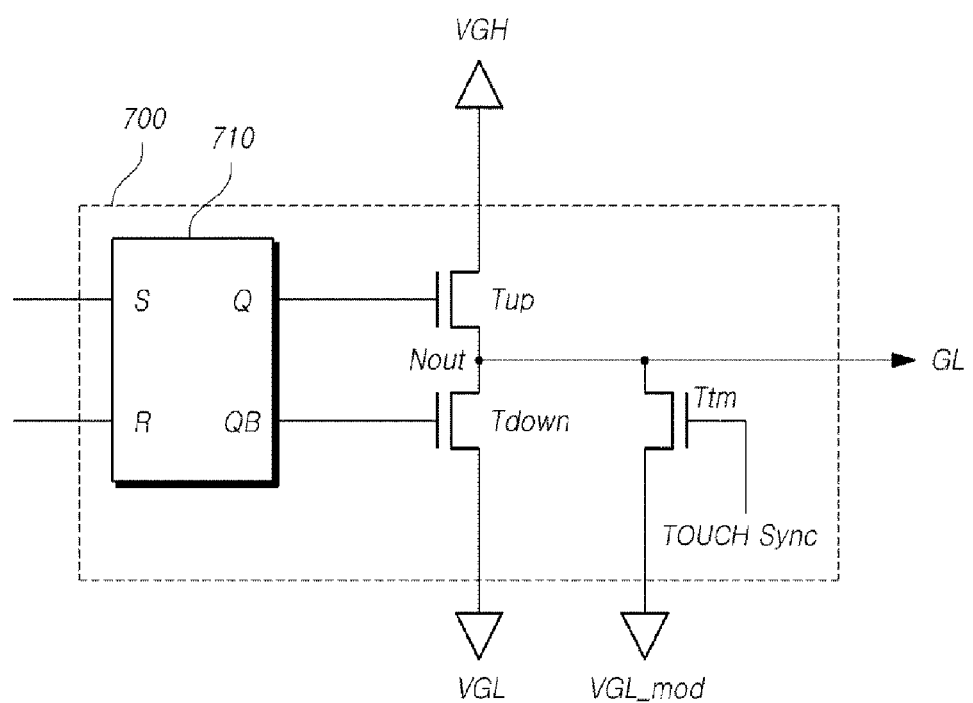
FIG. 10 is an example view illustrating a gate driving integrated circuit having the basic gate driving structure and a touch mode transistor structure in the touch screen panel integrated display device according to an embodiment.

FIG. 10 is an example view illustrating the gate driving integrated circuit 700 having a basic gate driving structure (one pull-down transistor Tdown using structure) and a touch mode transistor structure in the touch screen panel integrated display device 100 according to an embodiment.

Referring to FIG. 10, the gate driving integrated circuit 700 includes the pull-up transistor Tup and the pull-down transistor Tdown for outputting the scan signal to the corresponding gate line GL when the driving mode is the display mode, the touch mode transistor Ttm for outputting the touch driving signal Vtm (VGL_mod) or the signal corresponding to the touch driving signal Vtm to the corresponding gate line GL, and the control circuit 710 for controlling the pull-up transistor Tup, the pull-down transistor, etc.

Here, the control circuit 710 includes the Q node at which the gate voltage of the pull-up transistor Tup is controlled, the QB node at which the gate voltage of the pull-down transistor is controlled, the set node S and the reset node R.

Referring to FIG. 10, in each frame period, when the driving mode is the display mode, in each frame period, the gate driving integrated circuit 700 turns on the pull-up transistor Tup and outputs the high level voltage VGH to the gate line GL through the output node Nout in order to activate the corresponding gate line GL, and turns on the pull-down transistor Tdown and outputs the low level voltage VGL to the gate line through the output node Nout in order to deactivate the corresponding gate line GL.

Referring to FIG. 10, when the driving mode is the touch mode, the gate driving integrated circuit 700 turns on the touch mode transistor Ttm and outputs the touch driving signal Vtm (VGL_mod) which is modulated from the low level voltage VGL and has the square waveform or the signal corresponding to the touch driving signal Vtm to the gate line GL through the output node Nout.

Referring to FIG. 10, a source (or a drain) of the touch mode transistor Ttm is connected to the point Nout where the pull-up transistor Tup and the pull-down transistor Tdown are connected to each other and the scan signal is output to the corresponding gate line GL.

In addition, the touch driving signal Vtm (VGL_mod) or the signal corresponding to the touch driving signal Vtm (VGL_mod) is applied to the drain (or the source) of the touch mode transistor Ttm.

Further, a touch synchronization signal Touch Sync is applied to a gate of the touch mode transistor Ttm. Here, the touch synchronization signal Touch Sync is for turning on the touch mode transistor Ttm when the driving mode is the touch mode and for turning off the touch mode transistor Ttm when the driving mode is the display mode.

Referring to FIG. 10, when the driving mode is the touch mode, the pull-down transistor Tdown is turned off, and the touch mode transistor Ttm is turned on.

As described above, when the driving mode is the touch mode, the gate driving integrated circuit 700 shown in FIG. 10 outputs a touch driving signal VGL_mode of which the size and the phase are identical to those of the touch driving signal Vtm applied to at least one of the plurality of common electrodes CE11, CE12, CE13, CE14, CE21, CE22, CE23, CE24, CE31, CE32, CE33 and CE34 through the touch mode transistor Ttm, or a signal corresponding to the touch driving signal VGL_mode to the corresponding gate line GL in each frame.

As shown in FIG. 10, in the touch mode, the pull-down transistor Tdown used in the display mode is not used and the touch mode transistor Ttm is used, and the touch driving signal VGL_mod or the signal corresponding to the touch driving signal VGL_mod is output to the corresponding gate line in the each frame. Thus, in the case of the display mode, problems occurring due to the degradation of the pull-down transistor Tdown can be remarkably reduced.

That is, as shown in FIG. 10, even though the pull-down transistor is degraded because the pull-down transistor turns on for a long time, the gate driving integrated circuit 700 having the touch mode transistor Ttm can perform a touch mode operation, regardless of the degradation of the pull-down transistor.

Figure 11:
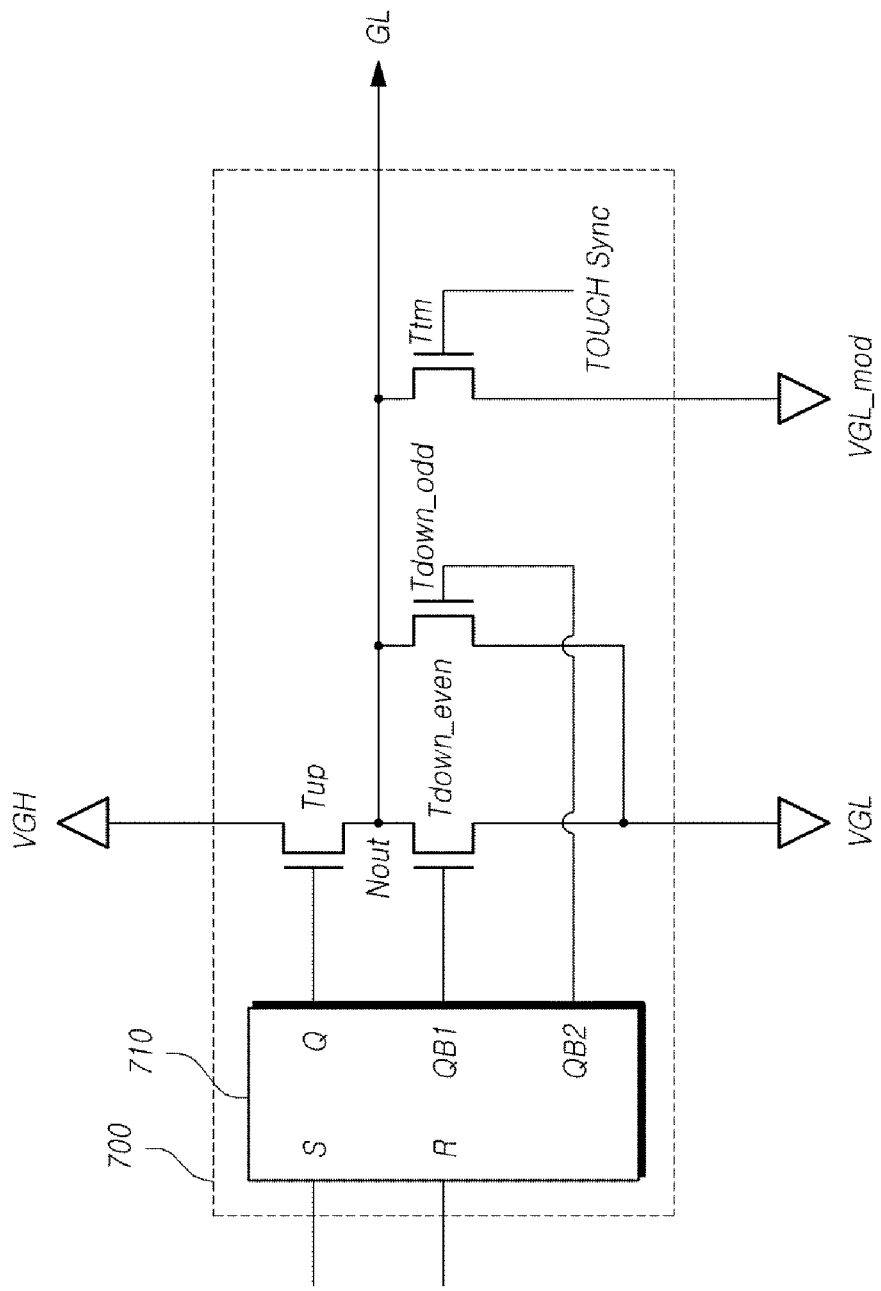
FIG. 11 is an example view illustrating a gate driving integrated circuit having an alternating gate driving structure and the touch mode transistor structure in the touch screen panel integrated display device according to an embodiment.

FIG. 11 is an example view illustrating the gate driving integrated circuit 700 having the alternating gate driving structure and the touch mode transistor structure in the touch screen panel integrated display device according to an embodiment.

Referring to FIG. 11, the gate driving integrated circuit 700 includes the pull-up transistor Tup, the first pull-down transistor Tdown_odd and the second pull-down transistor operated when the driving mode is the display mode. The gate driving integrated circuit 700 further includes the touch mode transistor Ttm operated when the driving mode is the touch mode.

Referring to FIG. 11, the gate driving integrated circuit 700 includes the control circuit 710 controlling one pull-up transistor Tup, two pull-down transistors Tdown_odd and Tdown_even, etc.

Here, the control circuit 710 includes the Q node at which the gate voltage of the pull-up transistor Tup is controlled, the QB2 node at which the gate voltage of the first pull-down transistor Tdown_odd is controlled, the QB1 node at which the gate voltage of the second pull-down transistor Tdown_even is controlled, the set node S and the reset node R.

Referring to FIG. 11, when the driving mode is the display mode, in the odd-numbered frame, the gate driving integrated circuit 700 turns on the pull-up transistor Tup and outputs the high level voltage VGH to the gate line GL through the output node Nout in order to activate the corresponding gate line GL, and turns on the first pull-down transistor Tdown_odd and outputs the low level voltage VGL to the gate line GL through the output node Nout in order to deactivate the corresponding gate line GL.

Referring to FIG. 11, when the driving mode is the touch mode, in the odd-numbered frame, the gate driving integrated circuit 700 turns on the touch mode transistor Ttm and outputs the touch driving signal Vtm (VGL_mod) which is modulated from the low level voltage VGL and has the square waveform to the gate line GL through the output node Nout.

Referring to FIG. 11, when the driving mode is the display mode, in the even-numbered frame, the gate driving integrated circuit 700 turns on the pull-up transistor Tup and outputs the high level voltage VGH to the gate line GL through the output node Nout in order to activate the corresponding gate line GL, and turns on the second pull-down transistor Tdown_even and outputs the low level voltage VGL to the gate line GL through the output node Nout in order to deactivate the corresponding gate line GL.

Referring to FIG. 11, when the driving mode is the touch mode, in the even-numbered frame, the gate driving integrated circuit 700 turns on the touch mode transistor Ttm and outputs the touch driving signal Vtm (VGL_mod), which is modulated from the low level voltage VGL and has the square waveform, to the gate line GL through the output node Nout.

Referring to FIG. 11, a source (or a drain) of the touch mode transistor Ttm is connected to the point Nout where the pull-up transistor Tup, the first pull-down transistor Tdown_odd and the second pull-down transistor Tdown_even are connected to each other and the scan signal is output to the corresponding gate line GL.

In addition, the touch driving signal Vtm (VGL_mod) or the signal corresponding to the touch driving signal Vtm (VGL_mod) is applied to the drain (or the source) of the touch mode transistor Ttm.

Further, a touch synchronization signal Touch Sync is applied to a gate of the touch mode transistor Ttm. Here, the touch synchronization signal Touch Sync is for turning on the touch mode transistor Ttm when the driving mode is the touch mode and turning off the touch mode transistor Ttm when the driving mode is the display mode. Referring to FIG. 11, when the driving mode is the touch mode, both of the first pull-down transistor Tdown_odd and the second pull-down transistor Tdown_even turn off and the touch mode transistor Ttm turns on.

As described above, when the driving mode is the touch mode, the gate driving integrated circuit 700 shown in FIG. 11 outputs the touch driving signal VGL_mode of which the size and the phase are substantially similar to those of the touch driving signal Vtm applied to at least one of the plurality of common electrodes CE11, CE12, CE13, CE14, CE21, CE22, CE23, CE24, CE31, CE32, CE33 and CE34 through the touch mode transistor Ttm, or the signal corresponding to the touch driving signal VGL_mode to the corresponding gate line GL in each frame.

Since the gate driving integrated circuit 700 shown in FIG. 11 has the alternating gate driving structure, the degradations of the first pull-down transistor Tdown_odd and the second pull-down transistor Tdown_even can be reduced compared to the gate driving integrated circuit 700 having the basic gate driving structure shown in FIGS. 8 and 10.

Therefore, the gate driving integrated circuit 700 having the alternating gate driving structure as shown in FIG. 11 can remarkably reduce the formation of the capacitance between the gate line GL and the common electrode CE formed by the generation of the potential difference between the gate line GL and the common electrode CE. Here, the potential difference is generated because the size or phase of the signal actually applied to the gate line GL becomes different from that of the touch driving signal VGL_mod desired to be applied due to the degradation of the pull-down transistor Tdown in the gate driving integrated circuit 700 having the basic gate driving structure shown in FIGS. 8 and 10.

In addition, since the gate driving integrated circuit 700 shown in FIG. 11 uses the touch mode transistor Ttm in the touch mode, even though the degradations of the first pull-down transistor Tdown_odd and the second pull-down transistor become different, the gate driving integrated circuit 700 shown in FIG. 11 is not influenced by the degradation difference.

That is, in the touch mode, the shown gate driving integrated circuit 700 uses the same touch mode transistor Ttm in each of the odd-numbered frame and the even-numbered frame and outputs the touch driving signal VGL_mod or the signal corresponding to the touch driving signal VGL_mod to the corresponding gate line GL during each frame.

Therefore, in the case of the display mode, even though the first pull-down transistor Tdown_odd and the second pull-down transistor Tdown_even are degraded or the degradations of the first pull-down transistor Tdown_odd and the second pull-down transistor Tdown_even become different in the gate driving integrated circuit 700 shown in FIG. 11, the gate driving integrated circuit 700 shown in FIG. 11 can normally perform the touch mode operation. Therefore, a potential difference between the gate line GL and the common electrode CE is not generated, and thus a parasitic capacitance between the gate line GL and the common electrode CE may not be formed or may be largely reduced.

Figure 12:
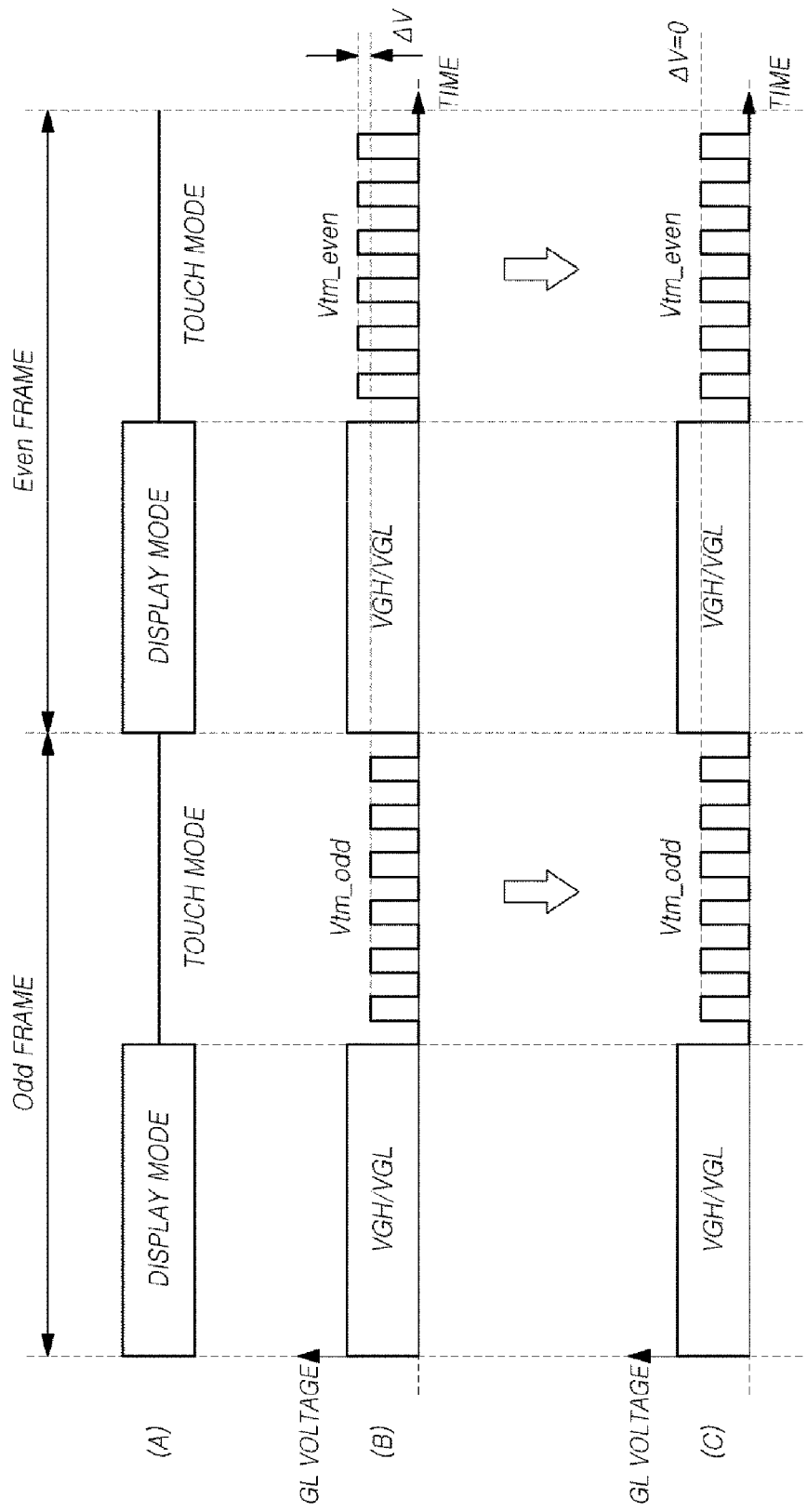
FIG. 12, parts (A) through (C) are waveforms for describing a difference of a signal applied to a gate line without a touch mode transistor Ttm and a signal applied to a gate line with a touch mode transistor Ttm, when the gate driving integrated circuit has the alternating gate driving structure.

FIG. 12, parts (A) through (C), are waveforms for describing a difference of a signal applied to the gate line without a touch mode transistor Ttm and a signal applied to a gate line with a touch mode transistor Ttm, when the gate driving integrated circuit 700 has the alternating gate driving structure.

FIG. 12, part (A) is a timing diagram illustrating an odd-numbered frame period and an even-numbered frame having a display mode period and a touch mode period. FIG. 12, part (B) is a view illustrating a signal actually applied to the gate line GL during the odd-numbered frame period and the even-numbered frame period by the gate driving integrated circuit 700, which has the alternating gate driving structure and does not include the touch mode transistor Ttm as shown in FIG. 9. FIG. 12, part (C) is a view illustrating a signal actually applied to the gate line GL during the odd-numbered frame period and the even-numbered frame period by the gate driving integrated circuit 700 which has the alternating gate driving structure and includes the touch mode transistor Ttm as shown in FIG. 11.

Referring to FIG. 12, part (B), in the case of the gate driving integrated circuit 700, which has the alternating gate driving structure and does not include the touch mode transistor Ttm as shown in FIG. 9, a potential difference ΔV is generated between a signal Vtm_odd actually applied to the gate line GL by the first pull-down transistor Tdown_odd in the case of the touch mode of the odd-numbered frame period and a signal Vtm_even actually applied to the gate line GL by the second pull-down transistor Tdown_even in the case of the touch mode of the even-numbered frame period, due to the degradation difference between the first pull-down transistor Tdown_odd operated during the odd-numbered frame and the second pull-down transistor Tdown_even operated during the even-numbered frame.

Referring to FIG. 12, part (C), in the case of the gate driving integrated circuit 700 which has the alternating gate driving structure and includes the touch mode transistor Ttm as shown in FIG. 11, since the same touch mode transistor Ttm is used regardless of the degradation difference between the first pull-down transistor Tdown_odd operated during the odd-numbered frame and the second pull-down transistor Tdown_even operated during the even-numbered frame, the potential difference ΔV is not generated between the signal Vtm_odd actually applied to the gate line GL by the touch mode transistor Ttm in the case of the touch mode of the odd-numbered frame period and the signal Vtm_even actually applied to the gate line GL by the touch mode transistor Ttm in the case of the touch mode of the even-numbered frame period. Thus, the generation of the parasitic capacitance between the common electrode CE and the gate line GL can be prevented.

Figure 13:
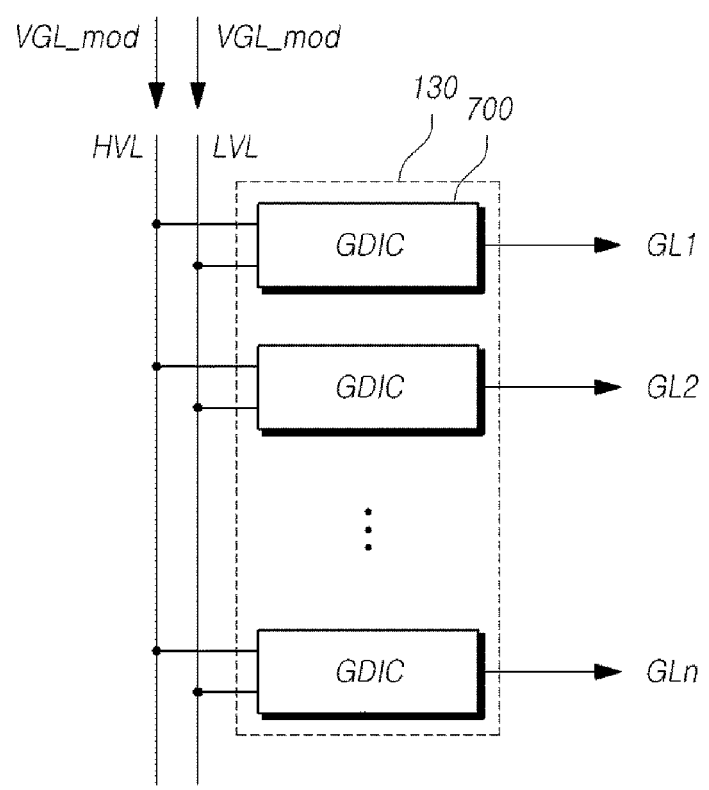
FIG. 13 is a diagram illustrating a signal applied to a low level voltage line and a high level voltage line when the driving mode is the touch mode in the touch screen panel integrated display device according to an embodiment.

FIG. 13 is a diagram illustrating a signal applied to the low level voltage line LVL and the high level voltage line HVL when the driving mode is the touch mode in the touch screen panel integrated display device 100 according to an embodiment.

Referring to FIG. 13, in the touch screen panel integrated display device 100 according to an embodiment, when the driving mode is the touch mode, in a case wherein the touch driving signal VGL_mod is applied to the gate driving integrated circuit 700 through the low level voltage line LVL, in order to prevent or reduce the generation of the parasitic capacitance between the low level voltage line LVL and the high level voltage line HVL, the touch driving signal VGL_mod may be applied to the high level voltage line HVL.

Figure 14:
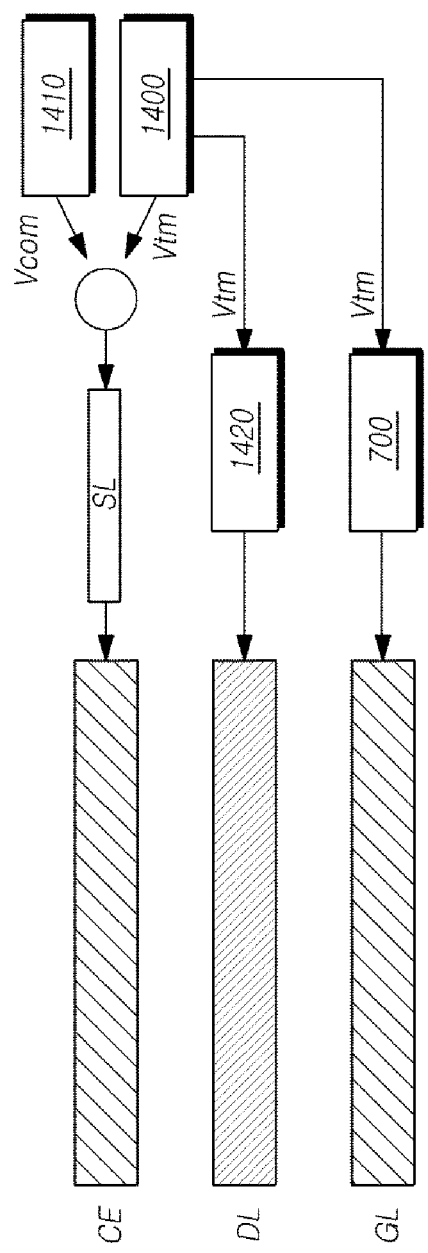
FIG. 14 is a view illustrating configurations for outputting signals to a common electrode, a data line and the gate line in the touch screen panel integrated display device according to an embodiment.

FIG. 14 is a view illustrating configurations for outputting signals to the common electrode CE, the data line DL and the gate line GL in the touch screen panel integrated display device 100 according to an embodiment.

Referring to FIG. 14, the touch screen panel integrated display device 100 according to an embodiment further includes a touch sensing unit 1400 which generates and outputs the touch driving signal Vtm, and a common voltage providing unit 1410 which provides the common voltage Vcom.

Referring to FIG. 14, the touch driving signal Vtm generated and output from the touch sensing unit 1400 or the common voltage Vcom provided from the common voltage providing unit 1410 are applied to the common electrode CE through a corresponding signal line SL according to the type of the driving mode.

Referring to FIG. 14, the touch driving signal Vtm generated and output from the touch sensing unit 1400 may be applied to a corresponding data line DL through the Data Driving Integrated Circuit (DDIC) 1420 included in the data driving unit 120.

Referring to FIG. 14, the touch driving signal Vtm generated and output from the touch sensing unit 1400 may be applied to a corresponding gate line GL through the Gate Driving Integrated Circuit (GDIC) 700 included in the gate driving unit 130.

Figure 15:
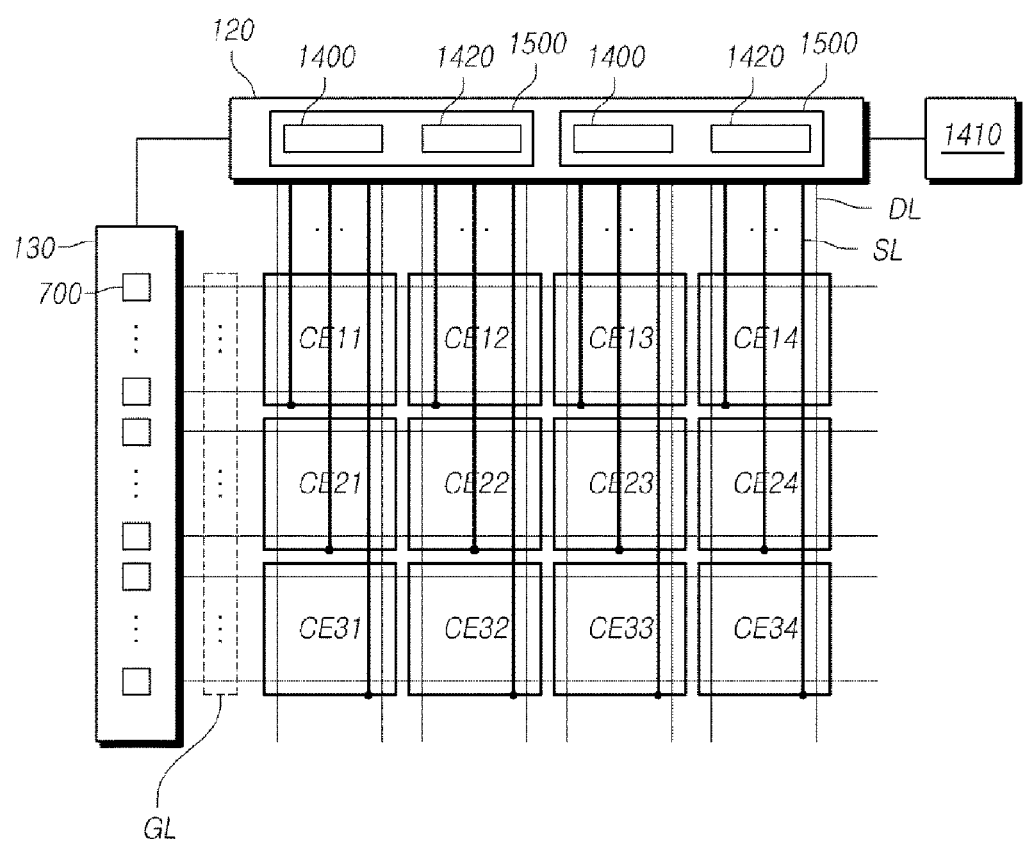
FIG. 15 is another example view of a touch sensing unit in the touch screen panel integrated display device according to an embodiment.

FIG. 15 is example view of a touch sensing unit 1400 in the touch screen panel integrated display device 100 according to an embodiment.

Referring to FIG. 15, the touch sensing unit 1400 may be implemented as a one-chip 1500 together with at least one data driving integrated circuit 1420 included in the data driving unit 120.

In this case, the data driving unit 120 may include at least one one-chip 1500.

In this case, the plurality of signal lines SL11, SL12, SL13, SL14, SL21, SL22, SL23, SL24, SL31, SL32, SL33 and SL34 are connected to the one-chip 1500. Alternatively, a subset of the signal lines SL11, SL12, SL13, SL14, SL21, SL22, SL23, SL24, SL31, SL32, SL33 and SL34 are connected to a corresponding chip 1500 from two or more chips 1500.

In addition, the common voltage Vcom provided from the common voltage providing unit 1410 is applied to the one-chip 1500.

The touch sensing unit 1400 included in the one-chip 1500 may select and output one of the common voltage Vcom applied from the common voltage providing unit 1410 and the touch driving signal Vtm generated from therein according to the type of the driving mode.

In the case of the display mode, the touch sensing unit 1400 included in the one-chip 1500 selects the common voltage Vcom applied from the common voltage providing unit 1410 and outputs the common voltage Vcom to the plurality of signal lines SL11, SL12, SL13, SL14, SL21, SL22, SL23, SL24, SL31, SL32, SL33 and SL34.

In the case of the touch mode, the touch sensing unit 1400 included in the one-chip 1500 may select the touch driving signal Vtm generated therein and output the touch driving signal Vtm to at least one of the plurality of signal lines SL11, SL12, SL13, SL14, SL21, SL22, SL23, SL24, SL31, SL32, SL33 and SL34.

Referring to FIG. 15, in the case of the touch mode, the touch driving signal Vtm generated from the touch sensing unit 1400 included in the one-chip 1500 is output to the data line DL through at least one data driving integrated circuit 1420 included in the one-chip 1500.

Referring to FIG. 15, in the case of the touch mode, the touch driving signal Vtm generated from the touch sensing unit 1400 included in the one-chip 1500 is output to the gate line GL through the gate driving integrated circuit 700 included in the gate driving unit 130.

Figure 16:
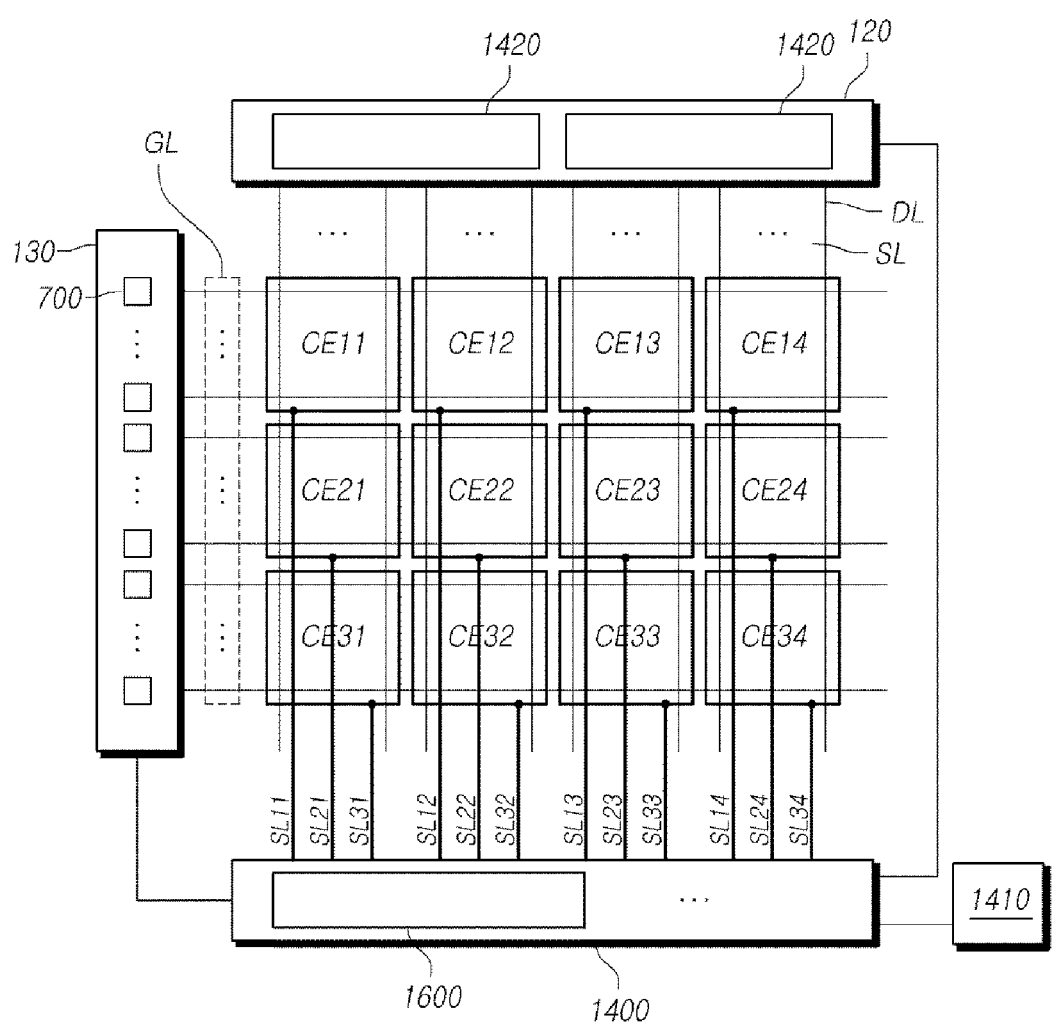
FIG. 16 is another example view of a touch sensing unit in the touch screen panel integrated display device according to an embodiment.

FIG. 16 is another example view of the touch sensing unit 1400 in the touch screen panel integrated display device 100 according to an embodiment.

Referring to FIG. 16, the touch sensing unit 1400 is implemented as at least one touch integrated circuit chip 1600, and the data driving unit 120 includes at least one of the data driving integrated circuits 1420 implemented as a chip.

Referring to FIG. 16, one of the touch driving signal Vtm generated and output from the touch integrated circuit chip 1600 and the common voltage Vcom provided from the common voltage providing unit 1410 may be selected and output through a switching element such as a multiplexer according to the type of the driving mode.

In the case of the display mode, the common voltage Vcom applied from the common voltage providing unit 1410 is selected and output to the plurality of signal lines SL11, SL12, SL13, SL14, SL21, SL22, SL23, SL24, SL31, SL32, SL33 and SL34.

In the case of the touch mode, the touch driving signal Vtm generated and output from the touch integrated circuit chip 1600 may be output to at least one of the plurality of signal lines SL11, SL12, SL13, SL14, SL21, SL22, SL23, SL24, SL31, SL32, SL33 and SL34.

Referring to FIG. 16, the touch driving signal Vtm generated and output from the touch integrated circuit chip 1600 may be transferred to the data driving unit 120 and the gate driving unit 130, and applied to the data line DL and the gate line GL.

As described above, according to the present invention, there is an effect of providing the touch screen panel integrated display device 100 and display panel 110 which can prevent the formation of the parasitic capacitance Cpara between the gate line GL and the common electrode CE formed in the display panel 110 when the touch driving signal is applied to the common electrode CE playing a role of the touch electrode.

According to the present invention, there is an effect of providing the touch screen panel integrated display device 100 and display panel 110 which can prevent the formation of the parasitic capacitance Cpara between the data line DL and the common electrode CE formed in the display panel 110 when the touch driving signal is applied to the common electrode CE playing a role of the touch electrode.

As described above, the formation of the parasitic capacitance Cpara is prevented or reduced, thereby reducing a load of a touch driving and further improving a touch sensing accuracy.

In addition, according to the present invention, even though the pull-down transistors Tdown, Tdown_odd and Tdown_even for outputting the scan signal of the low level voltage to the gate line GL in the display mode are degraded, regardless of the degradations, in the case of the touch mode, the touch driving signal can be applied to the gate line GL in a desired form using the touch mode transistor Ttm.

Therefore, the possibility of generating the parasitic capacitance Cpara between the common electrode CE and the gate line GL can be further reduced.

In addition, according to the present invention, in order to reduce the degradation of the pull-down transistor Tdown for outputting the scan signal of the low level voltage to the gate line GL in the display mode, when the different pull-down transistors Tdown_odd and Tdown_even are driven in the odd-numbered frame and the even-numbered frame respectively, regardless of the degradation difference between two pull-down transistors Tdown_odd and Tdown_even alternately operated in the odd-numbered frame and the even-numbered frame respectively, regardless of the degradation difference, in the case of the touch mode, the touch driving signal can be applied to the gate line GL in a desired form using the touch mode transistor Ttm.

Therefore, the possibility of generating the parasitic capacitance Cpara between the common electrode CE and the gate line GL can be further reduced.

While the technical spirit of the present invention has been exemplarily described with reference to the accompanying drawings, it will be understood by a person skilled in the art that the present invention may be varied and modified in various forms without departing from the scope of the present invention. Accordingly, the embodiments disclosed in the present invention are merely to not limit but describe the technical spirit of the present invention. Further, the scope of the technical spirit of the present invention is not limited by the embodiments. The scope of the present invention shall be construed on the basis of the accompanying claims in such a manner that all of the technical ideas included within the scope equivalent to the claims belong to the present invention.

What is claimed is:

1. A touch screen panel integrated display device comprising:
 a display panel including a plurality of data lines, a plurality of gate lines and a plurality of common electrodes;
 a data driving unit that provides a data voltage to the plurality of data lines, when a driving mode is a display mode; and
 a gate driving unit that sequentially provides a scan signal to the plurality of gate lines, when the driving mode is the display mode,
 wherein a common voltage is applied to the plurality of common electrodes when the driving mode is the display mode, a touch driving signal is applied to at least one of the plurality of common electrodes when the driving mode is a touch mode, and
 each of a plurality of gate driving integrated circuits included in the gate driving unit includes a pull-up transistor and a pull-down transistor for outputting the scan signal to a corresponding gate line when the driving mode is the display mode, and additionally includes a touch mode transistor for outputting the touch driving signal or a signal corresponding to the touch driving signal to the corresponding gate line when the driving mode is the touch mode.

2. The touch screen panel integrated display device of claim 1, wherein a source or a drain of the touch mode transistor is connected to a node where the pull-up transistor and the pull-down transistor are connected and the scan signal is output to the corresponding gate line, the touch driving signal or the signal corresponding to the touch driving signal is applied to the drain or the source of the touch mode transistor, and a touch synchronization signal is applied to a gate of the touch mode transistor, the touch synchronization signal turning on the touch mode transistor when the driving mode is the touch mode and turning off the touch mode transistor when the driving mode is the display mode.

3. The touch screen panel integrated display device of claim 1, wherein the pull-down transistor turns off and the touch mode transistor turns on when the driving mode is the touch mode.

4. The touch screen panel integrated display device of claim 1, wherein the pull-down transistor included in each of the plurality of gate driving integrated circuits includes a first pull-down transistor operated in an odd-numbered frame and a second pull-down transistor operated in an even-numbered frame.

5. The touch screen panel integrated display device of claim 4, wherein both of the first and second pull-down transistors turn off when the driving mode is the touch mode.

6. The touch screen panel integrated display device of claim 1, wherein each of the gate driving integrated circuits outputs the touch driving signal or the signal corresponding to the touch driving signal to a corresponding gate line during each frame through the touch mode transistor, as a modulation signal of which a size and a phase are equal to those of the touch driving signal applied to one of the plurality of common electrodes.

7. The touch screen panel integrated display device of claim 1, wherein the display panel includes a signal line connected to each of the plurality of common electrodes in order to transfer the common voltage to the plurality of common electrodes when the driving mode is the display mode and to transfer the touch driving signal to one of the plurality of common electrodes when the driving mode is the touch mode.

8. The touch screen panel integrated display device of claim 7, further comprising:

a touch sensing unit that generates and outputs the touch driving signal; and a common voltage providing unit that provides the common voltage.

9. The touch screen panel integrated display device of claim 8, wherein the touch sensing unit is implemented as one chip together with a data driving integrated circuit included in the data driving unit, the common voltage provided from the common voltage providing unit is applied to the one chip, and the touch sensing unit included in the one chip selects one of the common voltage applied from the common voltage providing unit and the touch driving signal generated from the touch sensing unit according to a type of the driving mode and outputs the selected one of the common voltage and the touch driving signal to the signal line.

10. The touch screen panel integrated display device of claim 8, wherein the touch sensing unit is implemented as at least one touch integrated circuit chip, the data driving unit includes at least one of a data driving integrated circuit having a chip type, and one of the touch driving signal output from the touch integrated circuit chip and the common voltage provided from the common voltage providing unit is selected according to a type of the driving mode and is output to the signal line.

11. The touch screen panel integrated display device of claim 8, wherein the display panel includes each of the plurality of gate driving integrated circuits formed in a Gate In Panel scheme, the display panel includes a high level voltage line and a low level voltage line transferring a high level voltage (VGH) and a low level voltage (VGL) to each of the plurality of gate driving integrated circuits so that each of the plurality of gate driving integrated circuits generates the scan signal, the touch sensing unit transfers the touch driving signal or the signal corresponding to the touch driving signal through the low level voltage line formed in the display panel, and each of the plurality of gate driving integrated circuits outputs the touch driving signal or the signal corresponding to the touch driving signal through the touch mode transistor when the driving mode is the touch mode.

12. The touch screen panel integrated display device of claim 11, wherein the touch sensing unit applies the touch driving signal or the signal corresponding to the touch driving signal to the high level voltage line formed in the display panel.

13. The touch screen panel integrated display device of claim 1, wherein the data driving unit outputs the touch driving signal or the signal corresponding to the touch driving signal to one of the plurality of data lines when the driving mode is the touch mode.

14. A touch screen panel integrated display panel comprising:

a common electrode to which a common voltage is applied in a case of a display mode and a touch driving signal is applied in a case of a touch mode;

a gate line that transfers a scan signal to a pixel row; and a gate driving integrated circuit that is connected to the gate line and outputs the scan signal to the gate line, wherein the gate driving integrated circuit includes a pull-up transistor and a pull-down transistor for outputting the scan signal to the gate line in the case of the display mode, and additionally includes a touch mode transistor for outputting the touch driving signal applied to the common electrode or a signal corresponding to the touch driving signal to the gate line in the case of the touch mode.

* * * * *